(12) United States Patent
Chang et al.

(10) Patent No.: US 11,083,243 B2
(45) Date of Patent: Aug. 10, 2021

(54) METHOD FOR MANUFACTURING A SHOE PART

(71) Applicant: CCILU INTERNATIONAL INC., Taichung (TW)

(72) Inventors: Shu-Li Chang, Taichung (TW); Chien-Chung Huang, Taichung (TW); Yeng-Fong Shih, Taichung (TW)

(73) Assignee: CCILU International Inc., Taichung (TW)

( * ) Notice: Subject to any disclaimer, the term of this patent is extended or adjusted under 35 U.S.C. 154(b) by 395 days.

(21) Appl. No.: 16/254,136

(22) Filed: Jan. 22, 2019

(65) Prior Publication Data

US 2020/0000176 A1    Jan. 2, 2020

(30) Foreign Application Priority Data

Jun. 29, 2018    (TW) .................. 107122456

(51) Int. Cl.
| | |
|---|---|
| *A43B 13/12* | (2006.01) |
| *A43B 13/04* | (2006.01) |
| *A43B 3/12* | (2006.01) |
| *B23P 15/00* | (2006.01) |
| *A43B 23/02* | (2006.01) |
| *A43B 1/14* | (2006.01) |

(52) U.S. Cl.
CPC ............. *A43B 13/12* (2013.01); *A43B 3/12* (2013.01); *A43B 13/04* (2013.01); *B23P 15/00* (2013.01); *Y10T 29/49984* (2015.01)

(58) Field of Classification Search
CPC ....... A43B 13/12; A43B 13/125; A43B 13/04; A43B 3/12; A43B 1/14; A43B 23/0225; B23P 15/00; Y10T 29/49984
See application file for complete search history.

(56) References Cited

U.S. PATENT DOCUMENTS

| | | | |
|---|---|---|---|
| 4,185,402 A * | 1/1980 | Digate ................. | A43B 1/0045 36/3 B |
| 8,440,138 B1 * | 5/2013 | Standifer ............. | A43B 7/1405 422/5 |
| 9,427,363 B2 * | 8/2016 | Park ..................... | A61F 13/472 |
| 2011/0034097 A1 * | 2/2011 | Chen ..................... | D06M 23/04 442/76 |

FOREIGN PATENT DOCUMENTS

| | | | |
|---|---|---|---|
| CN | 102408583 | * | 4/2012 |
| CN | 107136640 A | * | 9/2017 |

* cited by examiner

*Primary Examiner* — Bayan Salone
(74) *Attorney, Agent, or Firm* — Wang Law Firm, Inc.

(57) ABSTRACT

A method for manufacturing a shoe part includes: the first mixing step, the standing step, the second mixing step, the setting step, and the hot press forming step. The invention mainly uses the waste coffee grounds material as raw material to manufacture the shoe part. In addition to the aroma of coffee, the shoes have the functions of deodorization and dehumidification while being worn by the user, thereby achieving multiple objectives of environmentally friendly materials, low cost, strong structure and environmentally friendly after-use treatment.

8 Claims, 5 Drawing Sheets

METHOD FOR MANUFACTURING A SHOE PART

BACKGROUND

Field of the Invention

The present invention relates to a manufacturing method, and more particularly to a method for manufacturing a shoe part.

Related Prior Art

General shoe materials are made of polyurethane, leather or environmentally unfriendly materials. Because the limited air permeability of the shoe materials fail to achieve the desired effect of removing heat and moisture. When the user wears the shoes for a period of time, the user's feet tend to sweat and therefore feel uncomfortable because of the poor breathability sultry heat, which makes the shoes stink and smell and may even become a breeding ground for the growth of mold.

Furthermore, since the general shoe materials are made of polyurethane, they are not easily decomposed when buried in the soil, and when incinerated, the shoe materials will release many pollutants harmful to the human health, or toxins causing serious pollution to the environment. The shoe materials are difficult to recycle and decompose, and as a result, the amount of garbage is increased. This has caused serious damage to the global environment for many years. How to reduce the amount of garbage and meet the environmental recyclability has always been the goal pursued by modern people.

Modern people are influenced by Western culture, and the demand for coffee is increasing. Coffee provides many people with a full day of energy. However, drinking coffee will inevitably produce coffee grounds, and over time, the amount of the accumulated coffee grounds is staggering. Discarded coffee beans and used coffee grounds are often discarded as garbage. Although some coffee grounds can be recycled, the recycling speed is still no faster than the speed at which the coffee grounds are produced. Coffee grounds are organic wastes, and therefore can be incinerated or buried in the soil as fertilizers for the soil, and causes no harm. Taiwan is a densely populated region. In the case of limited land resources, if the proportion of recycling and reuse cannot be greatly increased, it will inevitably burden our living environment.

Therefore, how to solve the above problems and deficiencies is the direction that the creators of the present invention and related companies engaged in this direction are eager to study and improve.

SUMMARY

One objective of the present invention is to provide a method for manufacturing a shoe part, which mainly recovers and recycles the coffee grounds material, and has the effect of deodorizing and releasing coffee aroma. After use, the waste shoe parts can be naturally decomposed in the environment without causing damage to the environment, thus improving environmental benefits.

To achieve the above objective, a method for manufacturing a shoe part in accordance with the present invention comprises:

a first mixing step including: mixing a coffee grounds material with a porous material in a stirring manner to form a porous structure with coffee aroma;

a standing step including: leaving the porous structure to stand for a period of time in units of hours;

a second mixing step including: adding a rubber material, the rubber material covers the porous structure and is provided with a plurality of pores for the coffee aroma to penetrate, so as to form a shoe part filling material;

a setting step including: injecting the shoe part filling material into a shoe material mold; and a hot press forming step including: pressurizing and heating the shoe material mold to form the shoe part.

Preferably, in the first mixing step, the porous material is diatomaceous earth.

Preferably, in the first mixing step, the coffee grounds material is added in an amount of 20% to 40%.

Preferably, in the first mixing step, the porous material is added in an amount of 3% to 10%.

Preferably, in the second mixing step, the rubber material is natural rubber, or ethylene vinyl acetate copolymer.

Preferably, in the hot press forming step, the shoe part is an upper, a shoe decoration, a sole, or a connecting belt.

Preferably, in the second mixing step, the pores have a diameter larger than a diameter of gaseous molecules, so that the coffee aroma is passed through the plurality of pores of the rubber material.

Preferably, in the hot press forming step, the shoe part is applied to a shoe body, the shoe body includes an upper and a sole, and the shoe part is disposed between the upper and the sole.

The method for manufacturing a shoe part in accordance with the present invention comprises: the first mixing step, the standing step, the second mixing step, the setting step, and the hot press forming step. The invention mainly uses the waste coffee grounds material as raw material to manufacture the shoe part. In addition to the aroma of coffee, the shoes have the functions of deodorization and dehumidification while being worn by the user, thereby achieving multiple objectives of environmentally friendly materials, low cost, strong structure and environmentally friendly after-use treatment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
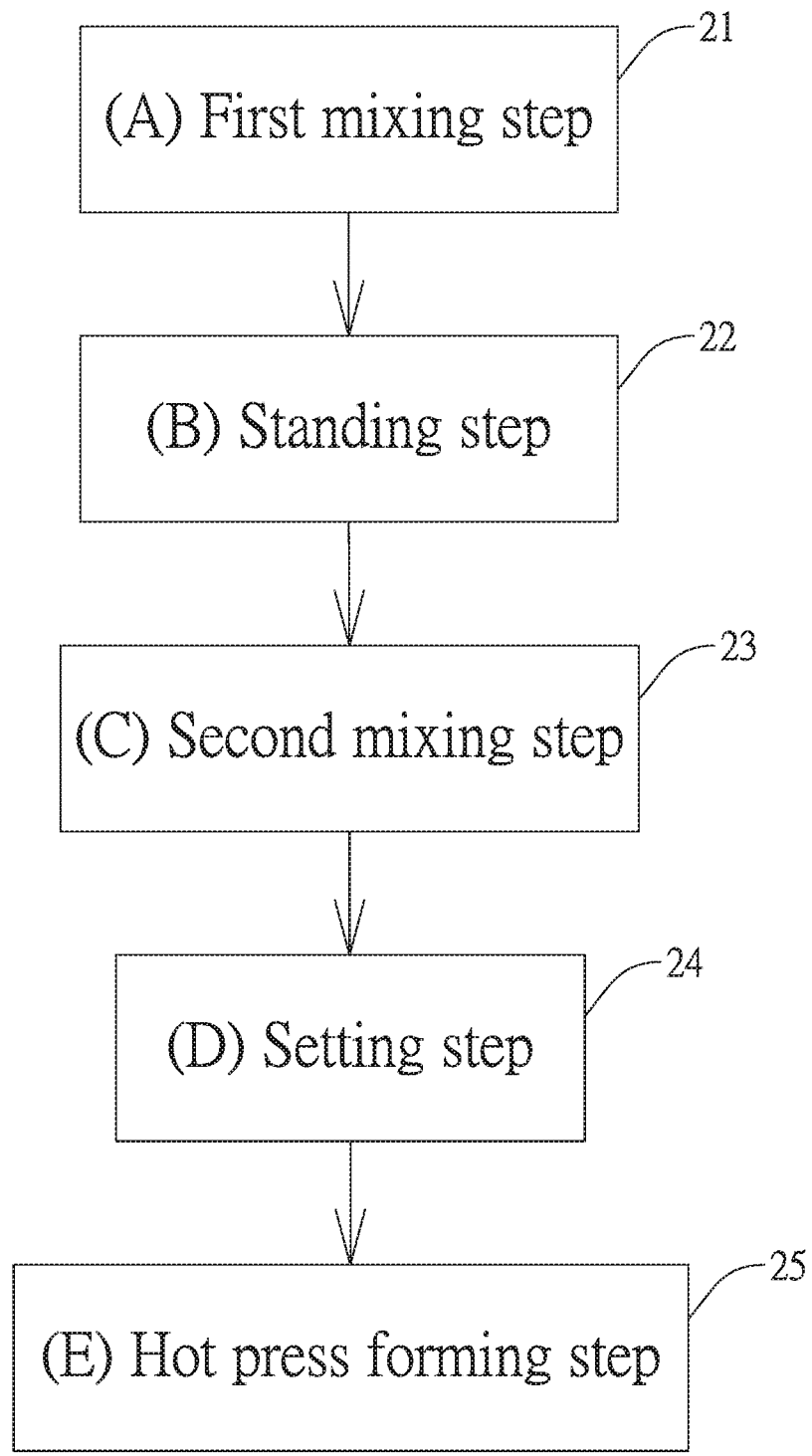
FIG. 1 is a flow chart of a first embodiment of the present invention.
Figure 2:
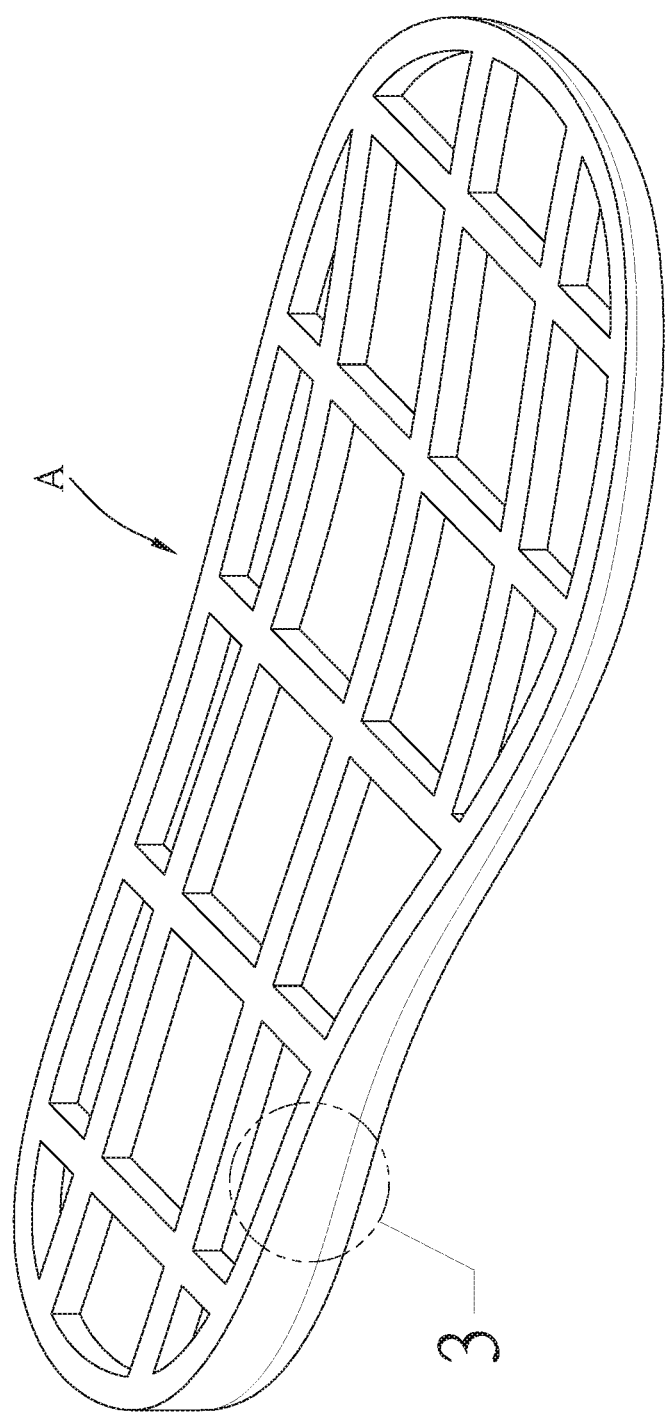
FIG. 2 is a perspective view of the first embodiment of the present invention showing that the shoe part is a sole.
Figure 3:
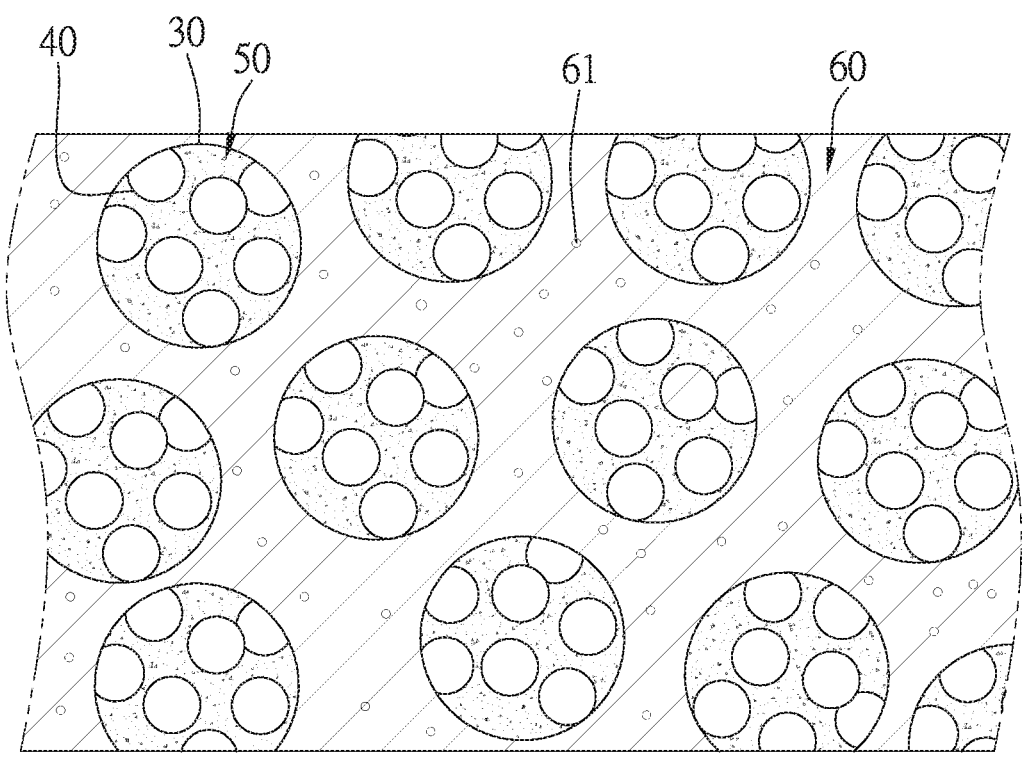
FIG. 3 is a cross-sectional view showing the first embodiment of the present invention.

Referring to FIG. 1 to FIG. 3, a method for manufacturing a shoe part in accordance with a first embodiment of the present invention comprises: (A) a first mixing step 21, (B) a standing step 22, (C) a second mixing step 23, (D) a setting step 24, and (E) a hot press forming step 25.

The (A) first mixing step 21 includes: mixing a coffee grounds material 30 with a porous material 40 in a stirring manner to form a porous structure 50 with coffee aroma. In this embodiment, the coffee grounds material 30 is ground coffee beans or coffee grounds, has the aroma of coffee and is granular. After a predetermined temperature (110° C. for example) of drying, the coffee grounds material is not subjected to high temperature carbonization and activation, therefore, there is still a lot of moisture inside the coffee grounds material, so the external volume is still very large, the weight is not easy to be blown by the wind, but after carbonization and activation, the moisture is completely removed, so that the particles become very small, according to the principle of activated carbon, the surface of the coffee grounds material 30 will be provided with many pores. When the coffee grounds material 30 is blended with the porous material 40, the porous material 40 is adsorbed in the pores of the coffee grounds material 30. In the (A) first mixing step 21, the porous material 40 is diatomaceous earth in the form of powder particles. The porous material 40 has a smaller diameter than the diameter of the coffee grounds material 30. The waste diatomaceous earth is recycled and used as a material for the manufacture of shoe materials, which enhances the value of waste recycling and reuse, and further reduces environmental pollution, which is in line with environmental protection requirements. In the (A) first mixing step 21, the coffee grounds material 30 is added in an amount of 20% to 40%, and the porous material is added in an amount of 3% to 10%. In the present embodiment, the coffee grounds material 30 is added in an amount of 40%, and the porous material 40 is added in an amount of 10%. Since the coffee grounds material 30 is similar in structure to the activated carbon, and contains a plurality of pores to absorb moisture, further, the coffee grounds material 30 is an acidic substance, it can neutralize ammonia gas to increase the absorption rate of odor, thereby achieving the value of waste recycling, reducing the environmental burden, and also having the functions of deodorization and dehumidification.

The (B) standing step 22 includes: leaving the porous structure 50 to stand for a period of time in units of hours. In this embodiment, the standing time is 1 hour to 2 hours as an example, of course, is not limited by this embodiment. After the standing time, the moisture content of the porous structure 50 will decrease, so that the coffee aroma can be retained more in the porous structure 50 and lasts longer, and thus obtaining a better porous structure 50.

The (C) second mixing step 23 includes: adding a rubber material 60, the rubber material 60 covers the porous structure 50 and is provided with a plurality of pores 61 for the coffee aroma to penetrate, so as to form a shoe part filling material 70. In this embodiment, the rubber material 60 is natural rubber (NR) for example, but is not limited thereto, or is ethylene vinyl acetate copolymer (EVA), and the rubber material 60 is added in an amount of 50%. Due to the fact that the rubber material 60 is effective in reinforcing the mechanical strength between the materials, and is non-toxic and environmentally-friendly green material, more specifically, the rubber material 60 has a plurality of pores 61, and the pores 61 have a diameter larger than a diameter of the gaseous molecules, so that the coffee aroma is passed through the plurality of pores 61 of the rubber material 60 to achieve a fragrant effect.

The (D) setting step 24 includes: injecting the shoe part filling material 70 into a shoe material mold. In this embodiment, the shoe material mold comprises a stationary mold and a movable mold corresponding to the stationary mold. The shoe part filling material 70 in the form of liquid is evenly distributed in the cavity of the stationary mold, thereby facilitating the setting work.

The (E) hot press forming step 25 includes: pressurizing and heating the shoe material mold to form a shoe part A. In this embodiment, the movable mold presses and heats the stationary mold so as to form the solid and integrally formed shoe part A. The shoe part A is a shoe sole as an example, but is not limited thereto, and may also be a shoe upper, shoe decoration, or connecting belt, etc. Thereby, with the shoe part A manufactured by the above-mentioned manufacturing method, the value of waste recycling and reuse is improved. In addition to reducing waste, there will be no residue pollution and natural ecology problem in subsequent environmental recycling.

Figure 4:
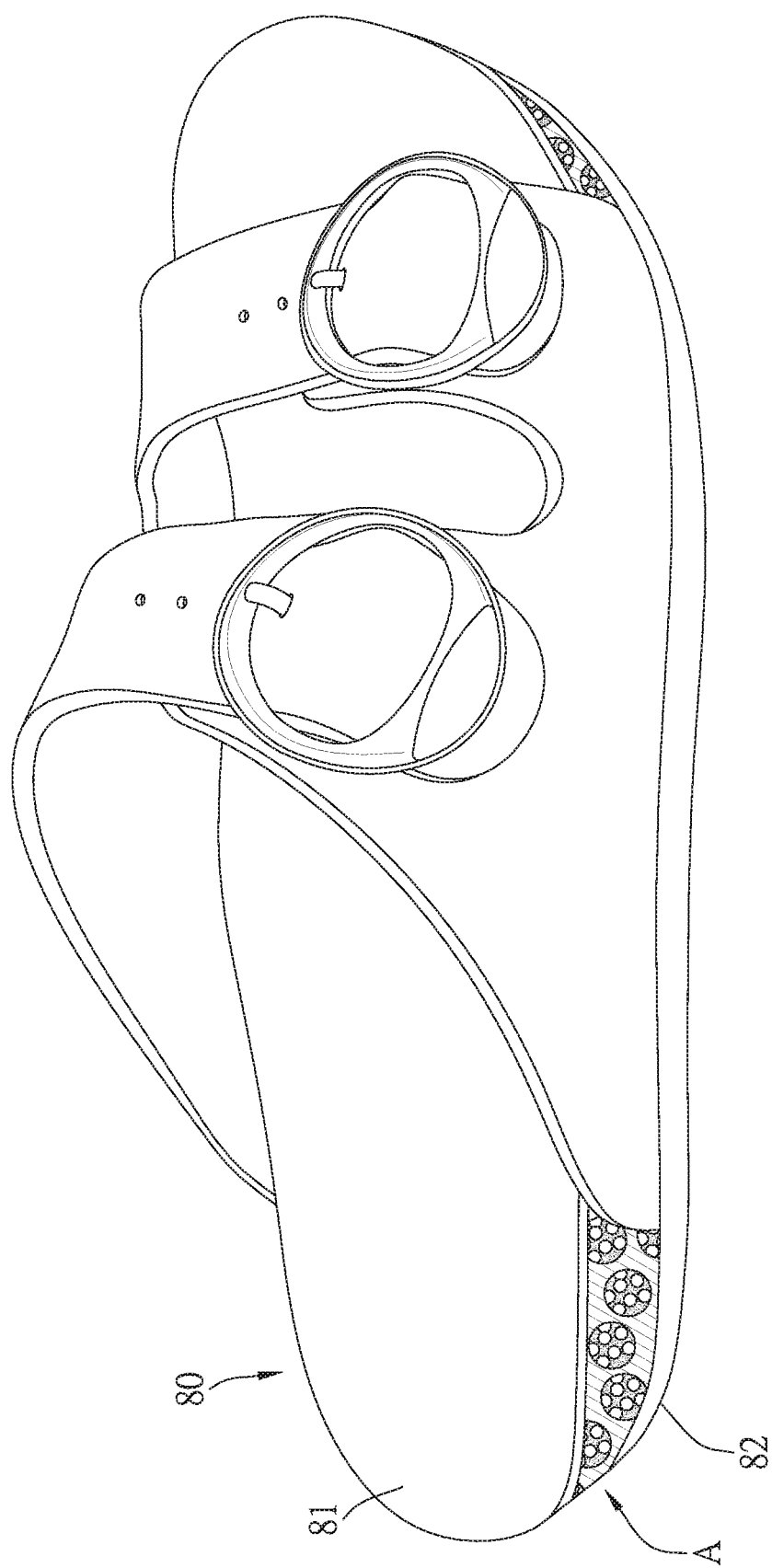
FIG. 4 is a perspective view of a second embodiment of the present invention showing that the present invention is applied to a shoe body.

Referring to FIG. 4, which is a perspective view of a second embodiment of the present invention, wherein the shoe part A is applied to a shoe body 80, and the shoe body 80 includes an upper 81 and a sole 82. The shoe part A is disposed between the upper 81 and the sole 82. Therefore, the present invention is easy to decompose in the natural environment to reduce environmental damage to meet the environmental protection needs of today's society, does not have a harmful impact on the environment, and allows people to obtain an environmentally friendly, sustainable, non-toxic living environment.

Figure 5:
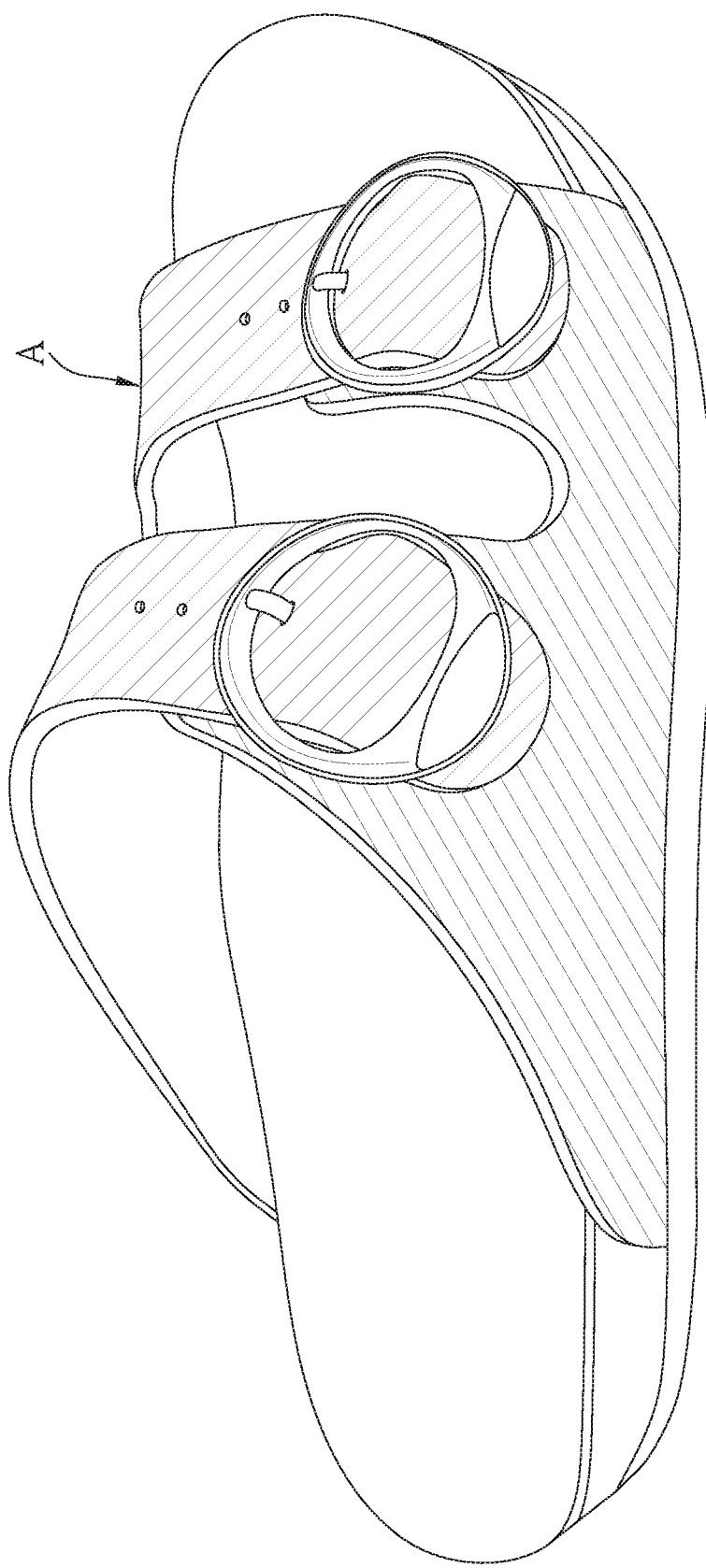
FIG. 5 is a perspective view of the third embodiment of the present invention showing that the shoe material is a connecting belt.

Referring to FIG. 5, which is a perspective view of a third embodiment of the present invention, wherein the shoe part A is a connecting belt, with the manufacturing method of the shoe part, the invention is not limited to the sole, and can manufacture any part of the shoe to achieve the diversity of application. Thereby, the embodiment can improve the recycling rate of waste, and meet the environmental protection requirements.

What mentioned above are the structures of the main components of the embodiment, for the operation and function of the invention are explained as follows.

The method for manufacturing a shoe part in accordance with the present invention comprises: the (A) first mixing step 21, the (B) standing step 22, the (C) second mixing step 23, the (D) setting step 24, and the (E) hot press forming step 25. The invention mainly uses the waste coffee grounds material 30 as raw material to manufacture the shoe part A. In addition to the aroma of coffee, the shoes have the functions of deodorization and dehumidification while being worn by the user, thereby achieving multiple objectives of environmentally friendly materials, low cost, strong structure and environmentally friendly after-use treatment.

While we have shown and described various embodiments in accordance with the present invention, it is clear to those skilled in the art that further embodiments may be made without departing from the scope of the present invention.

What is claimed is:

1. A method for manufacturing a shoe part, comprising:
   a first mixing step including: mixing a coffee grounds material with a porous material in a stirring manner to form a porous structure with coffee aroma;
   a standing step including: leaving the porous structure to stand for a period of time in units of hours;
   a second mixing step including: adding a rubber material, the rubber material covers the porous structure and is provided with a plurality of pores for the coffee aroma to penetrate, so as to form a shoe part filling material;
   a setting step including: injecting the shoe part filling material into a shoe material mold; and
   a hot press forming step including: pressurizing and heating the shoe material mold to form the shoe part.

2. The method for manufacturing the shoe part as claimed in claim 1, wherein in the first mixing step, the porous material is diatomaceous earth.

3. The method for manufacturing the shoe part as claimed in claim 1, wherein in the first mixing step, the coffee grounds material is added in an amount of 20% to 40%.

4. The method for manufacturing the shoe part as claimed in claim 1, wherein in the first mixing step, the porous material is added in an amount of 3% to 10%.

5. The method for manufacturing the shoe part as claimed in claim 1, wherein in the second mixing step, the rubber material is natural rubber, or ethylene vinyl acetate copolymer.

6. The method for manufacturing the shoe part as claimed in claim 1, wherein in the hot press forming step, the shoe part is an upper, a shoe decoration, a sole, or a connecting belt.

7. The method for manufacturing the shoe part as claimed in claim 1, wherein in the second mixing step, the pores have a diameter larger than a diameter of gaseous molecules, so that the coffee aroma is passed through the plurality of pores of the rubber material.

8. The method for manufacturing the shoe part as claimed in claim 1, wherein in the hot press forming step, the shoe part is applied to a shoe body, the shoe body includes an upper and a sole, and the shoe part is disposed between the upper and the sole.

* * * * *